(12) United States Patent
Hatano et al.

(10) Patent No.: US 9,290,827 B2
(45) Date of Patent: Mar. 22, 2016

(54) METHOD OF LEACHING COPPER AND GOLD FROM SULFIDE ORES

(75) Inventors: Kazuhiro Hatano, Hitachi (JP); Yoshifumi Abe, Hitachi (JP); Koji Katsukawa, Hitachi (JP); Eiki Ono, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 13/410,975

(22) Filed: Mar. 2, 2012

(65) Prior Publication Data

US 2012/0222519 A1 Sep. 6, 2012

(30) Foreign Application Priority Data

Mar. 4, 2011 (JP) ................................. 2011-047087

(51) Int. Cl.
*C22B 3/06* (2006.01)
*C22B 15/00* (2006.01)
*C22B 3/00* (2006.01)

(52) U.S. Cl.
CPC ............... *C22B 15/0069* (2013.01); *C22B 3/06* (2013.01); *C22B 11/04* (2013.01); *Y02P 10/234* (2015.11); *Y02P 10/236* (2015.11); *Y02W 30/54* (2015.05)

(58) Field of Classification Search
CPC ...... C22B 3/06; C22B 15/0069; C22B 11/042
USPC .......................................................... 75/744
See application file for complete search history.

(56) References Cited

U.S. PATENT DOCUMENTS

| | | | |
|---|---|---|---|
| 6,926,753 B2 | 8/2005 | Faine et al. | |
| 7,491,372 B2 | 2/2009 | Faine et al. | |
| 2008/0078269 A1 | 4/2008 | Abe et al. | |
| 2009/0241736 A1 | 10/2009 | Abe et al. | |

FOREIGN PATENT DOCUMENTS

| | | |
|---|---|---|
| CL | 45163 | 4/2004 |
| CL | 45162 | 7/2005 |
| JP | 2009-526912 A | 7/2009 |
| JP | 2009-235519 A | 10/2009 |

(Continued)

OTHER PUBLICATIONS

Australian Office Action, dated Dec. 14, 2012, for Australian Application No. 2012201281.

(Continued)

*Primary Examiner* — Kaj K Olsen
*Assistant Examiner* — Alexander Polyansky
(74) *Attorney, Agent, or Firm* — Birch, Stewart, Kolasch & Birch, LLP

(57) ABSTRACT

Disclosed is a method of leaching copper and gold from sulfide ores, which includes Process (1) of bringing a first aqueous acidic solution which contains chlorine ion, copper ion and iron ion, but no bromine ion, into contact with sulfide ores under supply of an oxidizing agent, so as to leach copper component contained in the sulfide ores; Process (2) of separating, by solid-liquid separation, a leaching reaction liquid obtained in Process (1), into a leaching residue and a leachate; and Process (3) of bringing a second aqueous acidic solution which contains chlorine ion, bromine ion, copper ion and iron ion, into contact with the leaching residue obtained in Process (2) under supply of an oxidizing agent, so as to leach gold contained in the leaching residue.

9 Claims, 1 Drawing Sheet

(56) References Cited

FOREIGN PATENT DOCUMENTS

| | | |
|---|---|---|
| JP | 2009-235525 A | 10/2009 |
| WO | WO 2005/031012 A1 | 4/2005 |
| WO | WO 2007/093666 A1 | 8/2007 |
| WO | WO 2007/134343 A2 | 11/2007 |

OTHER PUBLICATIONS

Japanese Office Action dated Mar. 26, 2013, for Japanese Application No. 2011-047087.

Chilean Office Action, dated Nov. 14, 2014, for Application No. 574-12 with English language translation.

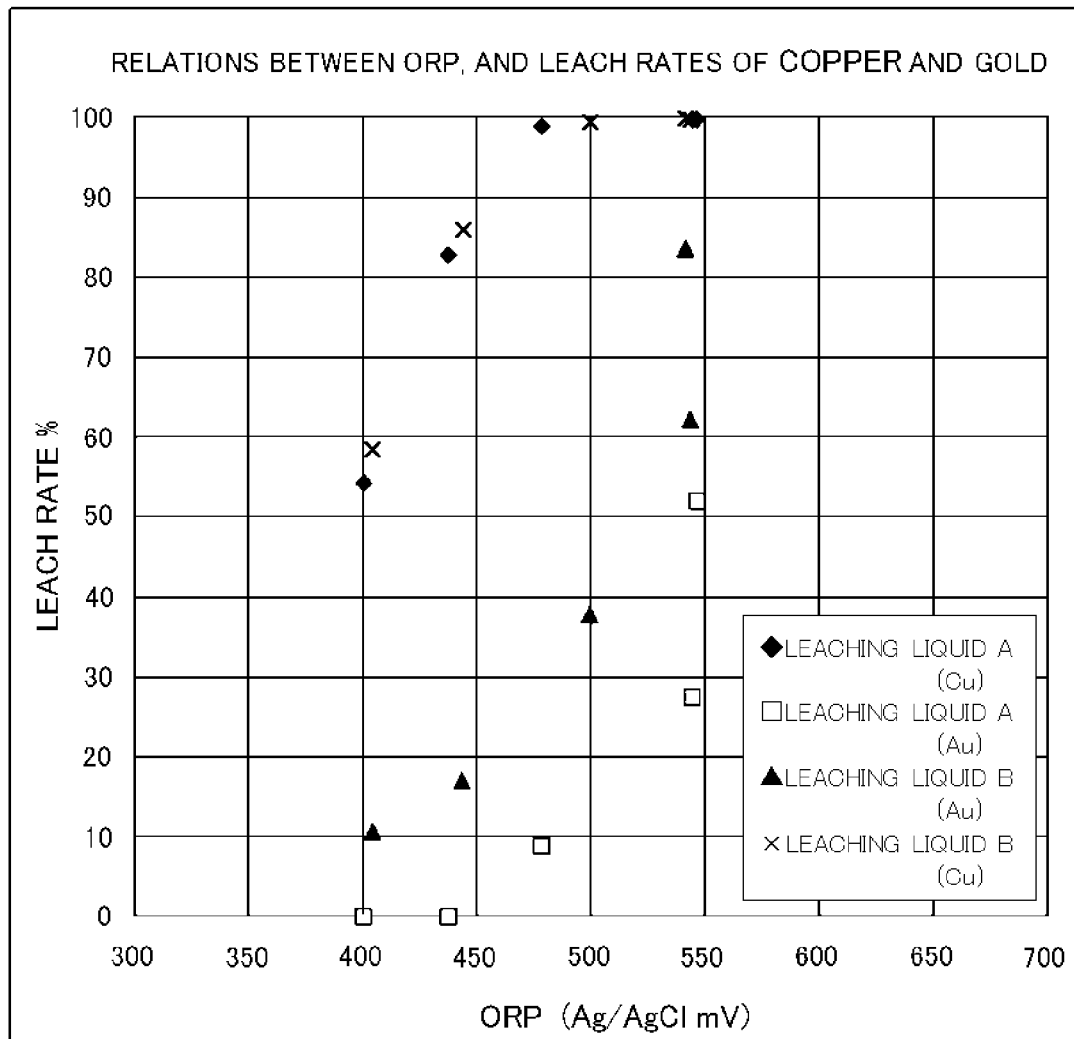

METHOD OF LEACHING COPPER AND GOLD FROM SULFIDE ORES

BACKGROUND

1. Technical Field

The present invention relates to a method of leaching copper and gold from sulfide ores.

2. Related Art

In recent years, a technique of recovering copper from sulfide ores by the wet process has been attracting attention, as a substitute for the conventional dry process. While the content is very small, the sulfide ores often contain additional noble metals such as gold, so that there is a need for economically recover not only copper but also such noble metals.

Known techniques of coping with the problem is such as subjecting the residue, remained after copper leaching, to gold leaching, using chloride and bromide of alkali metal or alkali earth metal, and chloride and bromide of copper and iron (Japanese Laid-Open Patent Publication No. 2009-235519). According to the description, the method successfully leaches and recovers copper and gold contained in copper sulfide ores at high leach rates, merely by making use of air, but without using any special oxidizing agent.

Another known method is such as subjecting the residue, remained after copper leaching, to gold leaching after the copper content in the residue is decreased to 7.9% or below, based on the knowledge that gold starts to leach after the copper content in the residue is decreased to 7.9 or below (Japanese Laid-Open Patent Publication No. 2009-235525).

SUMMARY

While the techniques proposed by the aforementioned documents may commercially be implemented as the methods for recovering copper and gold from sulfide ores based on the wet process, there are still room for improvement in efficiency of separation between copper and gold, and recovery yield of gold. It is therefore a subject of the present invention to provide a method of leaching copper and gold from sulfide ores, capable of improving the efficiency of separation between copper and gold, and the recovery yield of gold.

The present inventors found out after our extensive investigations, that the conventional methods degraded the separation efficiency between copper and gold, because gold leached to a considerable degree in the process of copper leaching. It is preferable that the copper leaching process allows thorough leaching of target copper, while suppressing leaching of gold. However, when the redox potential gradually elevates as the leaching of copper proceeds, gold starts to leach before copper is thoroughly leached out, which means the presence of an overlap region of redox potential in which both of copper and gold may leach. For this reason, the redox potential at the end point of the copper leaching process, set to some higher level aiming at enhancing the efficiency of copper leach, may undesirably allow gold to leach in the copper leaching process. On the other hand, any effort to suppress leaching of gold in the copper leaching process needs setting of the redox potential at the end point of the copper leaching process to a lower level. Leaching of gold may therefore be suppressed, but the gold leaching process starts while leaving the leaching of copper incomplete, and again the efficiency of separation between copper and gold may be unsatisfactory.

Gold might be recovered from the leachate, even if once it should leach out in the copper leaching process, but this idea needs additional process of recovering gold, and costs high.

The present inventors examined methods of suppressing, as possible, leaching of gold in the copper leaching process while ensuring thorough leaching of copper, and found out that it is effective to use a specific leaching liquid which contains no bromine ion but contains chlorine ion in the copper leaching process, and to use a specific leaching liquid which contains both of bromine ion and chlorine ion in the gold leaching process. The present invention was completed based on the findings.

According to one aspect of the present invention, there is provided a method of leaching copper and gold from sulfide ores, which includes:

Process (1) of bringing a first aqueous acidic solution which contains chlorine ion, copper ion and iron ion, but no bromine ion, into contact with sulfide ores under supply of an oxidizing agent, so as to leach copper component contained in the sulfide ores;

Process (2) of separating, by solid-liquid separation, a leaching reaction liquid obtained in Process (1), into a leaching residue and a leachate; and Process (3) of bringing a second aqueous acidic solution which contains chlorine ion, bromine ion, copper ion and iron ion, into contact with the leaching residue obtained in Process (2) under supply of an oxidizing agent, so as to leach gold contained in the leaching residue.

In one embodiment of the method of leaching copper and gold from sulfide ores according to the present invention, the Process (1) terminates when conditions stating a copper leach rate of 90% by mass or more, and a gold leach rate of 10% by mass or less, are satisfied.

In another embodiment of the method of leaching copper and gold from sulfide ores according to the present invention, Process (1) terminates in the range of redox potential (vs Ag/AgCl) from 450 to 500 mV.

In still another embodiment of the method of leaching copper and gold from sulfide ores according to the present invention, the redox potential (vs Ag/AgCl) of the first aqueous acidic solution at the start of Process (1) is 500 mV or above, and the redox potential (vs Ag/AgCl) of the second aqueous acidic solution at the start of Process (2) is 550 mV or above.

In still another embodiment of the method of leaching copper and gold from sulfide ores according to the present invention, the concentration ratio by weight of bromine ion to chlorine ion in the second aqueous acidic solution is 1 or larger.

In still another embodiment of the method of leaching copper and gold from sulfide ores according to the present invention, the oxidizing agent used in Process (1) and Process (2) is air.

BRIEF DESCRIPTION OF THE DRAWING

FIG. 1 is a chart illustrating relations between ORP (vs Ag/AgCl), and copper and gold leach rates.

DETAILED DESCRIPTION

<Process (1): Copper Leaching Process>

In Process (1), copper component in sulfide ores is leached, by bringing a leaching liquid (first aqueous acidic solution) which contains chlorine ion, copper ion and iron ion, but no bromine ion, into contact with sulfide ores under supply of an oxidizing agent. In other words, Process (1) is based on leaching of copper contained in sulfide ores by using a chloride bath as a leaching liquid, and further aimed at promoting the leaching reaction of copper under the presence of copper ion and iron ion which are generally contained in the sulfide ores. Methods of bringing the leaching liquid into contact with the sulfide ores may be spraying, dipping and so forth, which are selectable without special limitation. From the viewpoint of reaction efficiency, it is preferable to dip the sulfide ores into the leaching liquid and to stir. The sulfide ores are typically exemplified by gold-containing primary copper sulfide ore, and copper sulfide ore containing silicate ore, but not limited thereto.

Supply sources of chlorine ion are typically exemplified by hydrogen chloride, hydrochloric acid, metal chloride and chlorine gas, without special limitation. Taking economy and safety into account, supply in the form of metal chloride may be preferable. The metal chloride is exemplified by copper chlorides (copper (I) chloride, copper (II) chloride), iron chlorides (iron (II) chloride, iron (III) chloride), chlorides of alkali metals (lithium, sodium, potassium, rubidium, cesium, francium), and chlorides of alkali earth metals (beryllium, magnesium, calcium, strontium, barium, radium), wherein sodium chloride is preferable from the viewpoint of economy and availability. Also copper chloride and iron chloride are preferably used, since they may be used also as supply sources of copper ion and iron ion, respectively.

Copper ion and iron ion are supplied generally in the form of salts, and typically in the form of halides. Copper ion and iron ion are preferably supplied in the form of copper chloride and iron chloride, in view of using them as supply sources of chloride ion. Copper chloride and iron chloride adoptable herein are preferably copper (II) chloride ($CuCl_2$) and iron (III) chloride ($FeCl_3$), respectively, in view of oxidizing power. It is, however, of no difference if copper (I) chloride (CuCl) and iron (II) chloride ($FeCl_2$) are adopted, because they may be oxidized into copper (II) chloride ($CuCl_2$) and iron (III) chloride ($FeCl_3$), respectively, if any oxidizing agent is supplied to the leaching liquid.

Chlorine ion concentration in the leaching liquid (first aqueous acidic solution) used in Process (1) is preferably 70 g/L or more, and more preferably 140 g/L or more, in view of ensuring a high efficiency of the copper solubilizing reaction.

In order to enhance the leaching efficiency of copper, the leaching liquid may be acidic. In view of using the liquid also as a supply source of chloride ion, the acidity is adjusted using hydrochloric acid. pH of the leaching liquid is preferably adjusted to 0 to 3 or around, and more preferably 1 to 2 or around, in view of ensuring solubility of the leached copper. The redox potential (vs Ag/AgCl) of the leaching liquid at the start of Process (1) is preferably 500 mV or above, and more preferably 550 mV or above, in view of promoting leaching of copper.

The leaching liquid (first aqueous acidic solution) used in Process (1) does not contain bromine ion. This is because, presence of bromine ion in the leaching liquid will lower the redox potential at which leaching of gold starts, and thereby expands the overlap region in which gold starts to leach while leaving the leaching of copper incomplete. In other words, since the leaching liquid (first aqueous acidic solution) used in Process (1) in the present invention does not contain bromine ion, so that the redox potential at the end point of the copper leaching process may be kept high while suppressing gold from leaching, and thereby the leaching efficiency of copper may be elevated.

Accordingly, in a preferred embodiment of the present invention, a mixed solution of hydrochloric acid, copper (II) chloride, iron (III) chloride and sodium chloride may be used, as the leaching liquid (first aqueous acidic solution) in Process (1).

The copper leaching process of Process (1) is proceeded by supplying an oxidizing agent to control the redox potential. Unless the oxidizing agent is added, the redox potential will drop on middle way, and the leaching reaction will no longer proceed. The oxidizing agent is exemplified by oxygen, air, chlorine and hydrogen peroxide, without special limitation. It is, however, not preferable to use bromine compounds as the oxidizing agent. There is no need of using an oxidizing agent having an extremely high redox potential, but air is good enough. Air is also preferred from the viewpoints of economy and safety.

Temperature of the leaching liquid used for Process (1) is preferably adjusted to 60° C. or above, and more preferably 70 to 90° C., from the viewpoint of leaching efficiency and materials composing the apparatus. While Process (1) may otherwise be proceeded under pressure aiming at elevating the leaching efficiency, the atmospheric pressure is good enough. In order to promote the copper leaching, it is preferable to preliminarily crush and grind the sulfide ores to be processed.

Referring now to calcopyrite, a representative copper sulfide ore, the copper leaching in Process (1) is supposed to proceed according to the reaction formulae below:

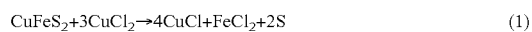

$$CuFeS_2+3CuCl_2 \rightarrow 4CuCl+FeCl_2+2S \qquad (1)$$

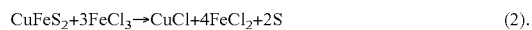

$$CuFeS_2+3FeCl_3 \rightarrow CuCl+4FeCl_2+2S \qquad (2).$$

When air is used as the oxidizing agent, in parallel with proceedings expressed by the formula (1) or (2), copper (I) chloride and iron (II) chloride resulted from the leaching reactions will be oxidized into copper (II) chloride and iron (III) chloride, respectively, according to the reaction formulae below:

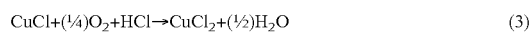

$$CuCl+(\tfrac{1}{4})O_2+HCl \rightarrow CuCl_2+(\tfrac{1}{2})H_2O \qquad (3)$$

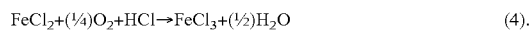

$$FeCl_2+(\tfrac{1}{4})O_2+HCl \rightarrow FeCl_3+(\tfrac{1}{2})H_2O \qquad (4).$$

Chemical species produced in the reactions expressed by the formulae (3) and (4) may be recycled in the leaching, as the oxidizing agents which appear in the formulae (1) and (2). As a consequence, the leach rate further elevates. Because of the fact that the reaction expressed by the formulae (3) and (4) proceed with the aid of oxygen blown into the leaching liquid, the copper leaching reaction may be continued by blowing air in the process of leaching reaction, while making use of copper (II) chloride or iron (III) chloride which is produced by oxidation of copper (I) chloride or iron (II) chloride leached out from the source ore.

The leaching liquid used in Process (1) initially has a high level of redox potential (vs Ag/AgCl) (500 mV or above, for example), but the redox potential drops sharply after the start of the leaching reaction upon contact of the leaching liquid with the sulfide ores. Thereafter, the redox potential gradually elevates as the copper leaching reaction proceeds under supply of an oxidizing agent. In the leaching liquid which contains no bromine ion, copper may thoroughly be leached if the redox potential (vs Ag/AgCl) is kept at 450 mV or above. While also gold is anticipated to start leaching under elevated redox potential, gold hardly leaches in the bromine ion-free leaching liquid if the redox potential (vs Ag/AgCl) is kept at 500 mV or below. Accordingly, a high level of separation efficiency between copper and gold may be obtained, by terminating the copper leaching reaction when the redox potential (vs Ag/AgCl) falls in the range from 450 to 500 mV, more preferably from 450 to 475 mV.

As a consequence, in a preferred embodiment of the present invention, Process (1) may be terminated when conditions stating a copper leach rate of 90% by mass or more, and a gold leach rate of 10% by mass or less, are satisfied. In a more preferred embodiment, Process (1) may be terminated when conditions stating a copper leach rate of 95% by mass or more, and a gold leach rate of 10% by mass or less, are satisfied.

<Process (2): Solid-Liquid Separation Process>

In Process (2), the leaching reaction liquid obtained by Process (1) is then separated by solid-liquid separation into a leaching residue and a leachate. The solid-liquid separation may be proceeded by using a filter press or a thickener, the method not being specifically limited. The leaching residue retains gold, and the leachate has copper dissolved therein.

While the copper leaching process in Process (1) may be implemented in a single stage, it may also be implemented in a multi-stage manner aiming at thorough leaching of copper in the sulfide ores. The multi-step copper leaching process may be implemented specifically by a first stage directed to the copper leaching operation, followed by the solid-liquid separation using a filter press or a thickener, and then by the next stage again directed to the copper leaching operation. The copper leaching process may typically be configured by 2 to 4 stages. In this case, each operation of the solid-liquid separation implemented in each leaching stage corresponds to Process (2).

<Process (3): Gold Leaching Process>

In Process (3), the leaching residue obtained in Process (2) (or obtained in the final process, for the case where Process (1) is implemented in the multi-stage manner to proceed Process (2) by multiple times) is brought into contact with the leaching liquid (second aqueous acidic solution) which contains chlorine ion, bromine ion, copper ion and iron ion under supply of an oxidizing agent, so as to leach gold component retained in the residue. The gold leaching proceeds in such a manner that leached gold reacts with chlorine ion or bromine ion to produce gold chloride complex or gold bromide complex. By using bromine ion together with chlorine ion, the complexes may be produced at lower redox potential, and thereby the leaching efficiency of gold may be improved. Iron ion acts in the form of trivalent ion, produced by oxidation under supply of the oxidizing agent or being intrinsically trivalent, to oxidize gold. While copper ion does not directly take part in the reaction, the presence of copper ion accelerates the oxidation by iron ion.

Methods of bringing the leaching liquid into contact with the residue may be spraying, dipping and so forth, which are selectable without special limitation. From the viewpoint of reaction efficiency, it is preferable to dip the residue into the leaching liquid and to stir.

Supply sources of chlorine ion are typically exemplified by hydrogen chloride, hydrochloric acid, metal chloride and chlorine gas, without special limitation. Taking economy and safety into account, supply in the form of metal chloride is preferable. The metal chloride is typically exemplified by copper chlorides (copper (I) chloride, copper (II) chloride), iron chlorides (iron (II) chloride, iron (III) chloride), chlorides of alkali metals (lithium, sodium, potassium, rubidium, cesium, francium), and chlorides of alkali earth metals (beryllium, magnesium, calcium, strontium, barium, radium). From the viewpoint of economy and availability, sodium chloride is preferable. Also copper chloride and iron chloride are preferably used, since they may be used also as supply sources of copper ion and iron ion, respectively.

Supply sources of bromine ion are typically exemplified by hydrogen bromide, hydrobromic acid, metal bromide and bromine, without special limitation. Taking economy and safety into account, it is preferably supplied in the form of metal bromide. The metal bromide is exemplified by copper bromides (copper (I) bromide, copper (II) bromide), iron bromides (iron (II) bromide, iron (III) bromide), bromides of alkali metals (lithium, sodium, potassium, rubidium, cesium, francium), and bromides of alkali earth metals (beryllium, magnesium, calcium, strontium, barium, radium). From the viewpoint of economy and availability, sodium bromide is preferable. Also copper bromide and iron bromide are preferably used, since they may be used also as supply sources of copper ion and iron ion, respectively.

Supply sources of copper ion and iron ion are supplied generally in the form of salts, and typically in the form of halides. Copper ion is preferably supplied in the form of copper chloride and/or copper bromide, and iron ion is preferably supplied in the form of iron chloride and/or iron bromide, in view of using them also as supply sources of chloride ion and/or bromine ion. Copper chloride and iron chloride adoptable herein are preferably copper (II) chloride ($CuCl_2$) and iron (III) chloride ($FeCl_3$), respectively, in view of oxidizing power. It is, however, of no difference if copper (I) chloride (CuCl) and iron (II) chloride ($FeCl_2$) are adopted, because they may be oxidized into copper (II) chloride ($CuCl_2$) and iron (III) chloride ($FeCl_3$), respectively, if any oxidizing agent is supplied to the leaching liquid.

Chlorine ion concentration in the leaching liquid (second aqueous acidic solution) used in Process (3) may be lower than that of the first aqueous acidic solution, and more preferably 30 g/L to 125 g/L. Bromine ion concentration in the leaching liquid (second aqueous acidic solution) used in Process (3) may preferably be 1 g/L to 100 g/L from the viewpoint of reaction rate and solubility, and more preferably 10 g/L to 40 g/L from the economical viewpoint. From the viewpoint of leaching efficiency of gold, the concentration ratio by weight of bromine ion to chlorine ion in the second aqueous acidic solution is preferably 1 or larger. Special consideration is, however, not necessary since the gold concentration is sufficiently low.

The redox potential (vs Ag/AgCl) of the leaching liquid at the start point of Process (3) is preferably adjusted to 550 mV or above, in view of accelerating leaching of gold, and is more preferably to 600 mV or above.

Accordingly, in a preferred embodiment of the present invention, a mixed solution containing at least either one of hydrochloric acid and hydrobromic acid; at least either one of copper (II) chloride and copper (II) bromide; at least either one of iron (III) chloride and iron (III) bromide; and at least either one of sodium chloride and sodium bromide, may be used as the leaching liquid (second aqueous acidic solution) in Process (3), provided that the selection is made so as to contain both of chlorine ion and bromine ion.

The gold leaching process in Process (3) is proceeded by supplying an oxidizing agent to control the redox potential. Unless the oxidizing agent is added, the redox potential will drop on middle way, and the leaching reaction will no longer proceed. The oxidizing agent is exemplified by oxygen, air, chlorine, bromine, and hydrogen peroxide, without special limitation. There is no need of using an oxidizing agent having an extremely high redox potential, but air is good enough. Air is also preferred from the viewpoints of economy and safety.

<Other Processes>

(Recovery of Copper)

The leachate obtained by Process (1) contains a large amount of copper component, so that copper may be recovered from the leachate. Methods of recovery of copper may typically be solvent extraction, ion exchange, displacement deposition with a less-noble metal, and electrowinning, without special limitation. While copper in the leachate exists both in the form of monovalent and divalent ions, it is preferable to preliminarily oxidize the ions to entirely make them divalent, for smoothness of solvent extraction and ion exchange. Methods of oxidation are not specifically limited, wherein a simple method may be employed by blowing of air or oxygen into the leachate.

(Recovery of Gold)

The leaching reaction liquid obtained by Process (3) contains gold dissolved therein, so that the gold may be recovered from the leaching reaction liquid. Methods of recovery of gold may typically be adsorption on activated carbon, electrowinning, solvent extraction, and ion exchange, without special limitation. The gold leach rate may be elevated by collecting gold on middle way of the leaching reaction so as to lower the concentration of gold in the leaching reaction liquid.

EXAMPLES

Experiment 1

Crushed copper concentrate having a composition expressed by Cu: 16% by mass, Fe: 26% by mass, S: 28% by mass and 63 g/t of Au, was prepared as the sulfide ore. Sixteen liters of each leaching liquid (first aqueous acidic solution), having the composition listed in Table 1, was heated to 70 to 85° C., 480 g of the copper concentrate is introduced and allowed to leach therein, under constant blowing of air (0.2 L/min) into the leaching liquid and stirring. Metals were analyzed by ICP optical emission spectrometry.

TABLE 1

|  | Leaching liquid A | Leaching liquid B |
| --- | --- | --- |
| Hydrochloric acid (g/L) | 6.9 | 6.9 |
| Iron (III) chloride (g/L) | 2 | 2 |
| Copper (II) chloride (g/L) | 18 | 18 |
| Total chloride ion (g/L) | 180 | 180 |
| Total bromide ion (g/L) | 0 | 5 |
| Initial ORP (mV) (vs Ag/AgCl) | 704 | 720 |

* Total chloride ion and total bromide ion were estimated while assuming complete ionization of the constituents of each leaching liquid. Total chlorine ion was adjusted to 180 g/L using sodium chloride. In Leaching liquid B, Bromine ion was added in the form of sodium bromide.

Relations between ORP (vs Ag/AgCl) in the leaching process, and copper and gold leach rates, obtained by the experiment, are shown in Tables 2-1, 2-2 and FIG. 1. The leach rates were calculated backwards from the contents in the leaching residue, assuming the contents in the sulfide ore as 100%. It was found from Tables 2-1, 2-2 and FIG. 1, that Cu showed substantially no difference in the leach rates between leaching liquids A and B, and that Cu showed a leach rate of approximately 90% by mass at 450-mV ORP, and that Cu showed 99% by mass or above at 500-mV ORP. On the other hand, Au was found to hardly leach up to 450-mV ORP when the bromine ion-free leaching liquid A was used, and it is also found that Au showed a leach rate of approximately 15% by mass at 500 mV. When the bromine-ion-containing leaching liquid B was used, the Au leach rate was found to be approximately 20% by mass at 450-mV ORP, and reached approximately 40% by mass at 500 mV.

TABLE 2-1

Leaching liquid A

| ORP | Cu leach rate (% by mass) | Au leach rate (% by mass) |
| --- | --- | --- |
| 400 | 54.2 | 0 |
| 437 | 82.7 | 0 |
| 478 | 98.8 | 8.8 |
| 544 | 99.6 | 27.4 |
| 546 | 99.7 | 52.0 |

TABLE 2-2

Leaching liquid B

| ORP | Cu leach rate (% by mass) | Au leach rate (% by mass) |
| --- | --- | --- |
| 404 | 58.5 | 10.6 |
| 443 | 85.9 | 17.0 |
| 499 | 99.3 | 37.8 |
| 541 | 99.6 | 62.2 |
| 543 | 99.8 | 83.6 |

While the experiment was conducted without the solid-liquid separation between the copper leaching process and the gold leaching process, it is understood from the results shown in the above that the gold leach rate may be elevated by using the bromide ion-containing leaching liquid B in the gold leaching process, while suppressing leaching of gold in the process of copper leaching, by using the bromide ion-free leaching liquid A in the copper leaching process. It is understood that copper and gold may be separated in a highly efficient manner, and gold may be recovered with a high recovery yield, typically by using the leaching liquid A and by setting ORP at the end of the copper leaching process in the range from 450 to 500 mV, then by conducting the solid-liquid separation, and by conducting the gold leaching process using the leaching liquid B. It is also understood that the copper leaching process may be terminated while satisfying the conditions stating a copper leach rate of 95% by mass or above, and a gold leach rate of 10% by mass or below.

According to the method of the present invention directed to leaching of copper and gold from sulfide ores, efficiency of separation between copper and gold may be improved in an economical manner, by using a leaching liquid which contains no bromine ion in the copper leaching process, and a particular technical effect represented by a high recovery yield of gold is additionally obtained by using a leaching liquid which contains bromine ion in the gold leaching process.

What is claimed is:
1. A method of leaching copper and gold from sulfide ores, comprising:
Process (1) of bringing a first aqueous acidic solution which contains chlorine ion, copper ion and iron ion, but no bromine ion, into contact with sulfide ores under supply of an oxidizing agent, so as to leach copper component contained in the sulfide ores;
Process (2) of separating, by solid-liquid separation, a leaching reaction liquid obtained in Process (1), into a leaching residue and a leachate; and
Process (3) of bringing a second aqueous acidic solution which contains chlorine ion, bromine ion, copper ion and iron ion, into contact with the leaching residue obtained in Process (2) under supply of an oxidizing agent, so as to leach gold contained in the leaching residue;

wherein the redox potential (vs Ag/AgCl) of the first aqueous acidic solution at the start of Process (1) is 500 mV or above;

wherein Process (1) terminates when conditions stating a copper leach rate of 90% by mass or more, and a gold leach rate of 10% by mass or less, are satisfied;

wherein Process (1) terminates in the range of redox potential (vs Ag/AgCl) from 450 to 500 mV; and wherein the redox potential (vs Ag/AgCl) of the second aqueous acidic solution at the start of Process (2) is 550 mV or above.

2. The method according to claim 1,
wherein the concentration ratio by weight of bromine ion to chlorine ion in the second aqueous acidic solution is 1 or larger.

3. The method according to claim 1,
wherein the oxidizing agent used in Process (1) and Process (2) is air.

4. The method according to claim 1,
wherein the oxidizing agent used in Process (1) and Process (2) is air.

5. The method according to claim 2,
wherein the oxidizing agent used in Process (1) and Process (2) is air.

6. A method of leaching copper and gold from sulfide ores, comprising:

Process (1) of bringing a first aqueous acidic solution which contains chlorine ion, copper ion and iron ion, but no bromine ion, into contact with sulfide ores under supply of an oxidizing agent, so as to leach copper component contained in the sulfide ores;

Process (2) of separating, by solid-liquid separation, a leaching reaction liquid obtained in Process (1), into a leaching residue and a leachate; and Process (3) of bringing a second aqueous acidic solution which contains chlorine ion, bromine ion, copper ion and iron ion, into contact with the leaching residue obtained in Process (2) under supply of an oxidizing agent, so as to leach gold contained in the leaching residue, wherein Process (1) terminates in the range of redox potential (vs Ag/AgCl) from 450 to 500 mV;

wherein the redox potential (vs Ag/AgCl) of the first aqueous acidic solution at the start of Process (1) is 500 mV or above; and wherein the redox potential (vs Ag/AgCl) of the second aqueous acidic solution at the start of Process (2) is 550 mV or above.

7. A method of leaching copper and gold from sulfide ores, comprising:

Process (1) of bringing a first aqueous acidic solution which contains chlorine ion, copper ion and iron ion, but no bromine ion, into contact with sulfide ores under supply of an oxidizing agent, so as to leach copper component contained in the sulfide ores;

Process (2) of separating, by solid-liquid separation, a leaching reaction liquid obtained in Process (1), into a leaching residue and a leachate; and Process (3) of bringing a second aqueous acidic solution which contains chlorine ion, bromine ion, copper ion and iron ion, into contact with the leaching residue obtained in Process (2) under supply of an oxidizing agent, so as to leach gold contained in the leaching residue, wherein Process (1) terminates when conditions reach a copper leach rate of 90% by mass or more, and a gold leach rate of 10% by mass or less, are satisfied;

wherein the redox potential (vs Ag/AgCl) of the first aqueous acidic solution at the start of Process (1) is 500 mV or above; and wherein the redox potential (vs Ag/AgCl) of the second aqueous acidic solution at the start of Process (2) is 550 mV or above.

8. The method according to claim 1, wherein the redox potential (vs Ag/AgCl) of the first aqueous acidic solution at the start of Process (1) is 550 mV or above.

9. The method according to claim 1, wherein Process (1) terminates in the range of redox potential (vs Ag/AgCl) from 450 to 475 mV.

* * * * *